United States Patent
Suwa

(10) Patent No.: US 9,288,839 B2
(45) Date of Patent: Mar. 15, 2016

(54) BASE STATION APPARATUS AND METHOD OF DECIDING MASTER BASE STATION APPARATUS

(71) Applicant: PANASONIC CORPORATION, Osaka (JP)

(72) Inventor: Yutaka Suwa, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 186 days.

(21) Appl. No.: 13/889,897

(22) Filed: May 8, 2013

(65) Prior Publication Data

US 2013/0301474 A1 Nov. 14, 2013

(30) Foreign Application Priority Data

May 11, 2012 (JP) ................................ 2012-110041

(51) Int. Cl.
*H04W 84/18* (2009.01)
*H04W 84/20* (2009.01)
*H04W 40/12* (2009.01)
(Continued)

(52) U.S. Cl.
CPC .............. *H04W 84/20* (2013.01); *H04W 40/12* (2013.01); *H04W 40/22* (2013.01); *H04W 88/08* (2013.01)

(58) Field of Classification Search
CPC ..... H04W 84/20; H04W 40/12; H04W 40/22; H04W 88/08; H04W 56/002; H04W 56/0075; H04W 56/0065; H04W 56/001; H04W 48/20; H04W 36/08; H04W 36/0083; H04W 92/20; H04L 12/28; H04B 7/2687; H04B 7/2696; H04B 7/2693; H04B 7/2668; H04B 7/00; H04B 7/1851; H04B 7/2662

USPC ......... 370/254, 465, 328, 331, 516, 350, 507; 375/356, 371, 362, 373, 357, 354; 455/361, 525, 462; 709/208
See application file for complete search history.

(56) References Cited

U.S. PATENT DOCUMENTS

| 6,445,688 B1 * | 9/2002 | Garces | H04B 7/0608 370/334 |
| 7,190,703 B1 | 3/2007 | Heitmann | |
| 7,626,966 B1 * | 12/2009 | Ruiter | H04M 1/725 370/310 |

(Continued)

FOREIGN PATENT DOCUMENTS

| JP | 2002-165269 A | 6/2002 |
| JP | 2003-509973 A | 3/2003 |

(Continued)

OTHER PUBLICATIONS

International Search Report mailed Jul. 23, 2013, for PCT/JP2013/063736, 4 pages.

*Primary Examiner* — Andrew Chriss
*Assistant Examiner* — Rasha Fayed
(74) *Attorney, Agent, or Firm* — Seed IP Law Group PLLC

(57) ABSTRACT

Each of the base station apparatuses measures received electric field strength of receivable signals from other base station apparatuses, and superiority in cases of indirectly connecting each of the base station apparatuses to another or other plural base station apparatuses by a route in which one or plural base station apparatuses are interposed and a case of making direct connection between the base station apparatuses are determined based on a measurement result of the received electric field strength and thereby, the base station apparatus used as the highest master is decided.

6 Claims, 18 Drawing Sheets

(51) Int. Cl.
*H04W 40/22* (2009.01)
*H04W 88/08* (2009.01)

(56) References Cited

U.S. PATENT DOCUMENTS

| | | | |
|---|---|---|---|
| 7,751,331 | B1 | 7/2010 | Blair et al. |
| 7,937,088 | B2 | 5/2011 | Nanda |
| 8,305,955 | B2 * | 11/2012 | Diab ............... H04J 3/0641 370/324 |
| 2004/0125776 | A1 * | 7/2004 | Haugli ............ H04L 12/12 370/338 |
| 2005/0073992 | A1 * | 4/2005 | Lee ................. H04W 40/28 370/351 |
| 2005/0135309 | A1 * | 6/2005 | Hester ............. H04L 45/00 370/331 |
| 2005/0207375 | A1 * | 9/2005 | Schiff ............. H04B 7/18534 370/331 |
| 2005/0213531 | A1 | 9/2005 | Nanda |
| 2006/0031429 | A1 | 2/2006 | Ayyagari |
| 2007/0133469 | A1 * | 6/2007 | Shin ............... H04W 40/34 370/331 |
| 2009/0034418 | A1 * | 2/2009 | Flammer, III ... H04W 40/248 370/238 |
| 2009/0073924 | A1 * | 3/2009 | Chou .............. H04L 45/20 370/328 |
| 2009/0168653 | A1 * | 7/2009 | St. Pierre ........ H04L 45/00 370/238 |
| 2010/0118736 | A1 * | 5/2010 | Chung et al. ................ 370/254 |
| 2011/0310754 | A1 * | 12/2011 | Laursen .......... H04J 3/0641 370/252 |
| 2012/0069943 | A1 * | 3/2012 | Lim ............... H04J 3/0641 375/371 |
| 2013/0077477 | A1 * | 3/2013 | Daraiseh ........ H04W 40/14 370/225 |
| 2013/0197955 | A1 * | 8/2013 | Dillon ............ H04W 40/246 705/7.13 |
| 2013/0223229 | A1 * | 8/2013 | Hui ............... H04W 40/02 370/238 |
| 2013/0272277 | A1 | 10/2013 | Suwa et al. |

FOREIGN PATENT DOCUMENTS

| | | |
|---|---|---|
| JP | 2006-050636 A | 2/2006 |
| JP | 2007-013543 A | 1/2007 |
| WO | 2010/069332 A1 | 6/2010 |
| WO | 2011056833 A1 | 5/2011 |
| WO | 2012/063491 A1 | 5/2012 |

* cited by examiner

FIG.6

| RSSI | Cost VALUE |
|---|---|
| ↑ | 1 |
| −40dBm | |
| \| | 2 |
| −50dBm | |
| \| | 3 |
| −60dBm | |
| \| | 4 |
| −70dBm | |
| \| | 5 |
| −80dBm | |
| ↓ | ∞ |

FIG.9

| | | | | | | CS | | | | | | |
|---|---|---|---|---|---|---|---|---|---|---|---|---|
| | | ① | ② | ③ | ④ | ⑤ | ⑥ | ⑦ | ⑧ | ⑨ | ⑩ | ⑪ | ⑫ |
| CS | ① | | 2 | 1 | 3 | 3 | 3 | 4 | 5 | 3 | 3 | 3 | 5 |
| | ② | 2 | | 3 | 3 | 3 | 3 | 1 | 3 | 3 | 4 | 3 | 4 |
| | ③ | 1 | 3 | | 1 | 4 | 3 | 4 | 4 | 3 | 3 | 4 | 3 |
| | ④ | 3 | 3 | 1 | | 2 | 2 | 4 | 3 | 5 | 3 | 4 | 4 |
| | ⑤ | 3 | 3 | 4 | 2 | | 4 | 3 | 3 | 3 | 3 | 4 | 3 |
| | ⑥ | 3 | 3 | 3 | 2 | 4 | | 4 | 2 | 5 | 4 | 3 | 3 |
| | ⑦ | 4 | 1 | 4 | 4 | 3 | 4 | | 3 | 1 | 3 | 2 | 3 |
| | ⑧ | 5 | 3 | 4 | 3 | 3 | 2 | 3 | | 4 | 5 | 4 | 3 |
| | ⑨ | 3 | 3 | 3 | 5 | 3 | 5 | 1 | 4 | | 1 | 5 | 3 |
| | ⑩ | 3 | 4 | 3 | 3 | 3 | 4 | 3 | 5 | 1 | | 3 | 4 |
| | ⑪ | 3 | 3 | 4 | 4 | 4 | 3 | 2 | 4 | 5 | 3 | | 2 |
| | ⑫ | 5 | 4 | 3 | 4 | 3 | 3 | 3 | 3 | 3 | 4 | 2 | |

BASE STATION APPARATUS AND METHOD OF DECIDING MASTER BASE STATION APPARATUS

BACKGROUND

1. Field of the Invention

The present invention relates to a base station apparatus and method of deciding a master base station apparatus.

2. Description of the Related Art

In a related art communication system (for example, a PBX (Private Branch eXchange) wireless system), a communication terminal sequentially switches a base station targeted for communication among plural base station apparatuses (hereinafter also called a "base station" simply) to move. Such switching between the base stations is called a handover. The plural base stations must synchronize timing of transmitting and receiving mutually in order that the communication terminal communicating with the base station using a time division wireless communication scheme (for example, TDMA/TDD) suitably hands over between the plural base stations.

As methods for synchronizing the plural base stations, the following methods are known. A time information server transmits time information to the plural base stations through a LAN (Local Area Network). Then, each of the base stations adjusts a clock generator of the inside of its own apparatus based on the time information and a point in time of receiving the time information (for example, see JP-T-2003-509973).

Also, the following method is known. Among plural base stations, a master-slave relation (synchronous tree) is built as a master for generating transmission timing and reception timing and a slave for synchronizing with its master, and one base station is set as the master with the highest layer. The other base stations operate as the slaves for following the base stations with the high layers, and receive a synchronous signal transmitted from the master base station by wireless, and sets its own transmission timing and reception timing. Then, the slave base station corrects a lag in the transmission timing and the reception timing with respect to the other side of synchronization at predetermined time intervals (for example, see JP-A-2002-165269).

Also, the following method is known. JP-A-2006-50636 discloses that an ad hoc network is organized from a set of plural nodes and a central coordinator node is automatically selected. This is the method in which a topology map for describing quality and the number of communication links between the nodes with respect to all the nodes is created and the best candidate node is selected from this map information and an efficient network capable of a high-definition two-way communication link between the nodes is achieved (see JP-A-2006-50636).

SUMMARY

In such a system, in order to synchronize with a higher level master base station, each of the base stations normally receives a synchronous signal transmitted by the master base station periodically. Then, in the case of failing to detect the synchronous signal, each of the base stations goes out of synchronization with other base stations. As a result, there is a possibility that each of the base stations cannot synchronize with other base stations with high accuracy except for a restart.

In the art of JP-T-2003-509973, when a clock function of the time information server stops, the plural base stations cannot synchronize mutually with high accuracy. In the art of JP-A-2002-165269, when a timing generating function of a reference station stops, the plural base stations cannot synchronize mutually with high accuracy.

In the case of building an IP-based interoffice public wireless system, a wired NW (Network) between a base station (corresponding to a cordless master unit) and a PBX (a main apparatus) is an IP basis, so that the wired NW cannot be used in timing information transmission. As a result, system timing is synchronized by wireless synchronization (air synchronization).

In hosted service, wireless system design using a sophisticated server cannot be done, so that each of the base stations must design a timing master and a synchronous tree by only mutual radio wave conditions and electric field strength. However, in a complicated radio wave environment of the inside of a building, it is difficult to design an exact tree by hand. After installation, a failure occurs in communication between the base stations and out of synchronization, a part of the base stations may stop operation.

JP-A-2006-50636 describes that an efficient network can be achieved by analysis of the topology map, but formation of an efficient tree configuration for synchronization in the base station of the time division wireless communication scheme is not suggested.

A non-limited object of the present invention is to provide a communication system and a base station apparatus capable of forming a more stable tree configuration and reducing a burden on an installation worker.

According to an aspect of the present invention, there is provided a base station apparatus used in a communication system having a time division communication scheme in which a plurality of base station apparatuses are connected and synchronize with reference to a master base station apparatus, the base station apparatus including a processor, adapted to: collect parameters concerning received electric field strength of communications between two arbitrary communicable base station apparatuses among the plurality of base station apparatuses; compare the collected parameters to set a route communicable directly or indirectly through one or more other interposed base station apparatuses between each arbitrary one of primary base station apparatuses and each one of other base station apparatuses other than the arbitrary one of the primary base station apparatuses among the plurality of base station apparatuses; check the number of the interposed base station apparatuses in each route to determine the maximum number of interposing among the routes as set, for each arbitrary one of the primary base station apparatuses; and select a primary base station apparatus which has the smallest maximum number of interposing among the primary base station apparatuses and decide the selected primary base station as the master base station apparatus.

As another aspect of the present invention, there is provided a method of deciding a master base station apparatus in a base station apparatus used in a communication system having a time division communication scheme in which a plurality of base station apparatuses are connected and synchronize with reference to the master base station apparatus, the method including: collecting parameters concerning received electric field strength of communications between two arbitrary communicable base station apparatuses among the plurality of base station apparatuses; comparing the collected parameters to set a route communicable directly or indirectly through one or more other interposed base station apparatuses between each arbitrary one of primary base station apparatuses and each one of other base station apparatuses other than the arbitrary one of the primary base station apparatuses among the plurality of base station apparatuses; checking the number of the interposed base station apparatuses in each route to determine the maximum number of interposing among the routes as set, for each arbitrary one of the primary base station apparatuses; and selecting a primary base station apparatus which has the smallest maximum number of interposing among the primary base station apparatuses and deciding the selected primary base station as the master base station apparatus.

According to the present invention, it is unnecessary for an installation worker to sequentially examine a communication environment, and a more stable tree configuration can be formed and a burden on the worker can be reduced.

BRIEF DESCRIPTION OF THE DRAWINGS

FIG. 6 is a diagram showing one example of correspondence relation between received electric field strength and a cost value of the base station apparatus in the embodiment of the present invention.

FIG. 9 is a diagram showing a table representing one example of the cost values between the plural base station apparatuses measured in the embodiment of the present invention.

DETAILED DESCRIPTION

An embodiment of the present invention will hereinafter be described using the drawings.

Figure 1:
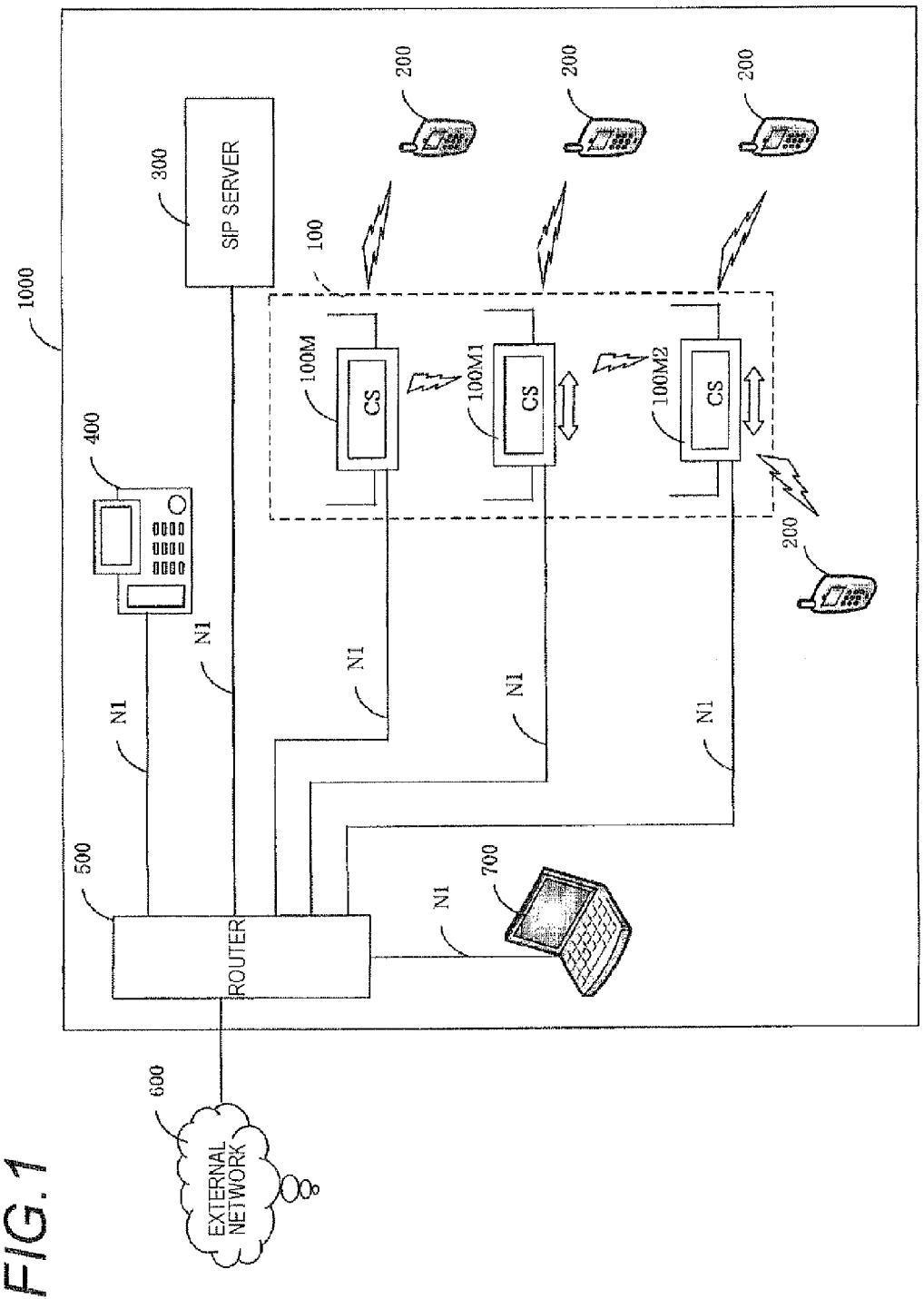
FIG. 1 is a block diagram showing a configuration example of a communication system in an embodiment of the present invention.

FIG. 1 is a diagram showing a configuration example of a communication system 1000 in an embodiment of the present invention. The communication system 1000 includes a base station apparatus (CS: Cell Station) 100, a communication terminal (PS: Personal Station) 200, a SIP (Session initiation Protocol) server 300, a telephone set 400, and a router 500.

The plural CSs 100 are hierarchically present inside the communication system 1000. In FIG. 1, the plural CSs 100 are described as a CS 100M, a CS 100M1 and a CS 100M2. In FIG. 1, the CS 100M is arranged at the highest layer and is, for example, an apparatus (Timing master CS) used as the reference of synchronization. The CS 100M1 and the CS 100M2 are arranged at a low layer of the CS 100M and are apparatuses (Slave CS) operating with the reference of synchronization of the CS 100M. The CS 100M1 and the CS 100M2 may be also hierarchically arranged. For example, the CS 100M1 is arranged at a layer higher than the CS 100M2.

The PS 200 operates as a child unit and is a mobile communication terminal The PS 200 is, for example, a mobile telephone, a personal digital assistant (PDA) or a portable sensor device. The PS 200 acquires position information using, for example, a GPS function had by the PS 200, and hands over to the CS 100 based on the acquired position information.

Using a SIP protocol, the SIP server 300 associates, for example, a telephone number with an IP address, and performs call control processing for calling the other side of communication and making connection.

The telephone set 400 is, for example, an internal telephone set, and communicates with another telephone apparatus (for example, the PS 200) through, for example, the SIP server 300.

The router 500 connects the communication system 1000 to an external network 600, and relays data in the communication system 1000 and data in the external network 600.

A personal computer (PC) 700 includes software for configuration work, and supports installation work of the CS by a worker, and functions to start survey operation for deciding a master base station (master CS) described below. The software for configuration work is one of programs, and is stored in, for example, memory (not shown) of the PC 700. A CPU (not shown) etc. of the PC 700 implement various functions by executing a program of the configuration work software.

Also, the router 500, the CS 100, the PS 200, the SIP server 300, telephone set 400 and the PC 700 are connected through a wired network N1 (for example, an IP network).

Figure 2:
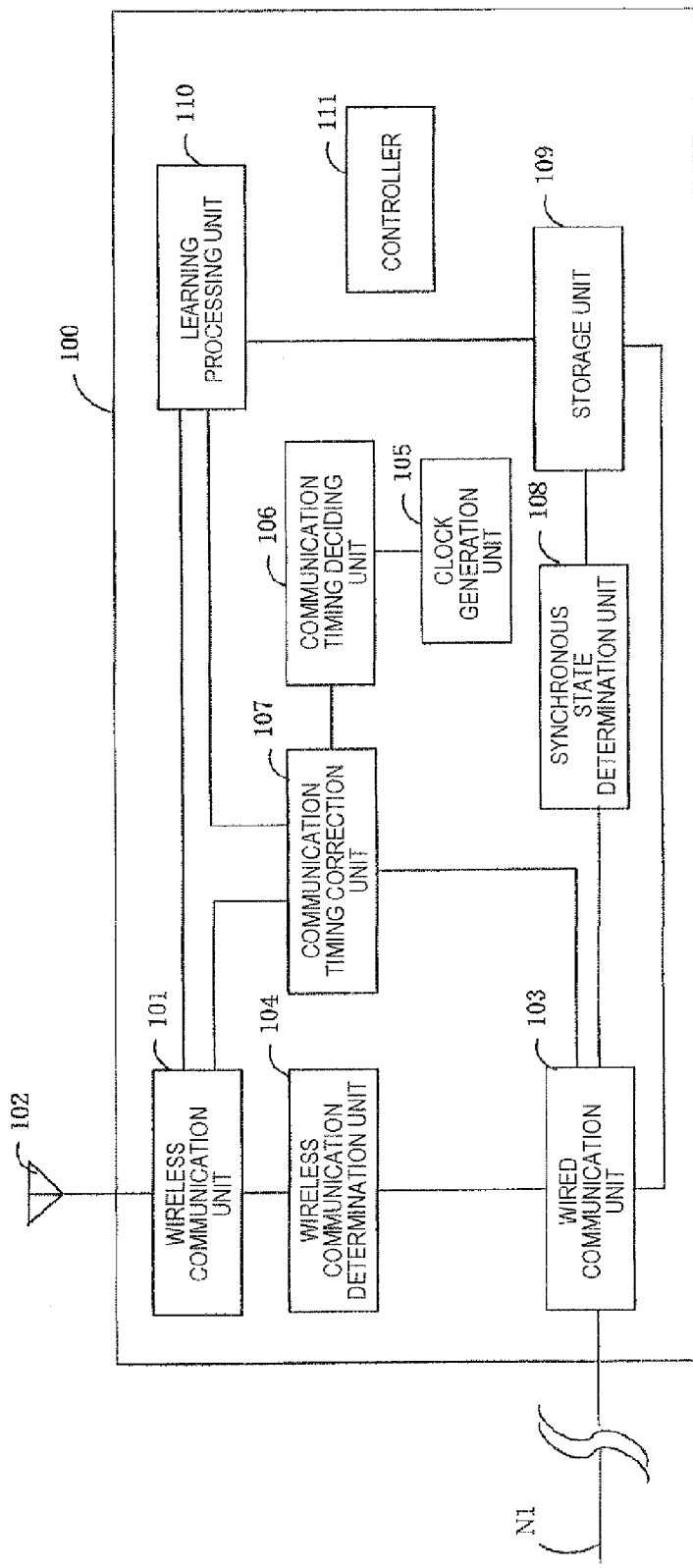
FIG. 2 is a block diagram showing a configuration example of a base station apparatus in the embodiment of the present invention.

Next, a configuration example of the CS 100 will be described. FIG. 2 is a block diagram showing the configuration example of the CS 100. The CS 100 includes a wireless communication unit 101, an antenna unit 102, a wired communication unit 103, a wireless communication determination unit 104, a clock generation unit 105, a communication timing deciding unit 106, a communication timing correction unit 107, a synchronous state determination unit 108, a storage unit 109, a learning processing unit 110, and a controller 111.

The wireless communication unit 101 communicates with another communication apparatus through the antenna unit 102 and a wireless network. The wireless network is, for example, a wireless communication network by a DECT (Digital Enhanced Cordless Telecommunication) standard.

The wired communication unit 103 communicates with another communication apparatus through the wired network. The wired network is, for example, a wired LAN, a wired WAN or a power line.

The wireless communication determination unit 104 determines whether or not the wireless communication unit 101 normally receives a synchronous signal from a master CS. The wireless communication determination unit 104 determines whether or not the wireless communication unit 101 of CS receives the synchronous signal from the master CS at predetermined reception timing. Cases of failing to detect the synchronous signal includes, for example, a case where a power supply of another CS which transmits the synchronous signal to CS is in an off state, or a case where radio interference occurs at reception timing of the synchronous signal. In addition, the master CS is a CS used as the reference of synchronization for each CS, and may be a CS other than the CS 100M.

The clock generation unit 105 generates a reference clock for operating each unit in CS and also deciding communication timing of the wireless communication unit 101.

The communication timing deciding unit 106 decides communication timing of a communication signal by the wireless communication unit 101 based on the reference clock of the clock generation unit 105. The communication signal includes a synchronous signal for synchronizing with other CSs.

The communication timing correction unit 107 corrects communication timing at which the wireless communication unit 101 communicates based on a synchronous signal acquired from another CS through, for example, the wired network in the case of failing to detect the synchronous signal from the master CS. The communication timing includes at least one of transmission timing and reception timing by the wireless communication unit 101.

The controller 111 controls each unit in CS so as to cooperate with other CSs and perform survey operation described below.

The PC 700 executes the software for configuration work and thereby, decides that one of the plural CSs is a temporary master CS, and transmits starting instructions to its CS. The controller 111 of the CS which has received the starting instructions executes the survey operation.

Figure 14:
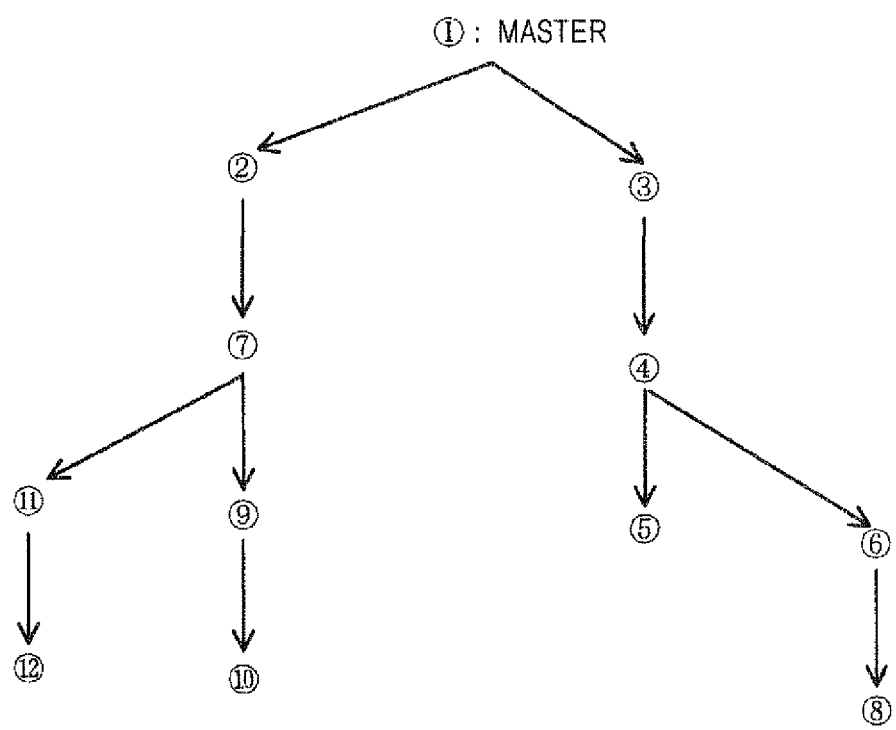
FIG. 14 is a diagram representing one example of a tree configuration in the case of deciding that a base station apparatus is a master of the highest layer in the embodiment of the present invention.

In an example of a tree configuration shown in FIG. 14, wireless synchronization of a certain CS (for example, CS(2)) is obtained according to a synchronous signal from a master CS (for example, CS(1)) arranged at a high layer. A CS(7) lower than the CS(2) synchronizes according to a synchronous signal from the CS(2) which is a master. The other CSs synchronize according to synchronous signals from the higher master CSs.

In addition, the identification numeral of CS is herein described in parentheses like CS(1), but the identification numeral of CS is enclosed in circle in the drawings. Also in the drawings, a character of "CS" is omitted and each CS may be represented by only enclosing the identification numeral in circle.

The communication timing correction unit 107 of each CS corrects communication timing according to the synchronous signal from the CS arranged at the high layer. In addition, in the case of correcting the communication timing, a reference clock of the CS 100 may be corrected by a clock correction unit (not shown).

The storage unit 109 shown in FIG. 2 is constructed of, for example, ROM (Read Only Memory) or RAM (Random Access Memory), and stores various information. For example, the storage unit 109 stores information about a master CS to synchronize, or information about a candidate etc. of the CS which may result in a determination request destination of a synchronous state in the case of failing to detect synchronization.

Also, the storage unit 109 stores at least one piece of information about a slot and a transmission channel of a synchronous signal of another CS in the network, or information about receiving scheduled timing. The information about the transmission slot and the transmission channel of the synchronous signal is one example of information about a time position in which the synchronous signal is transmitted. Also, the storage unit 109 stores, for example, information about a correction parameter or information about a time lag obtained by learning processing.

The learning processing unit 110 decides a correction parameter for correcting communication timing according to a result of learning while sequentially learning a time lag between its own CS and another CS in an asynchronous state. Consequently, the learning processing unit 110 has a function as a correction parameter deciding unit. This correction parameter is used in a state of failing to detect.

In addition, the wireless communication determination unit 104, the communication timing deciding unit 106, the communication timing correction unit 107, the synchronous state determination unit 108 and the learning processing unit 110 implement each of the functions by executing programs stored in the storage unit 109.

Figure 3:
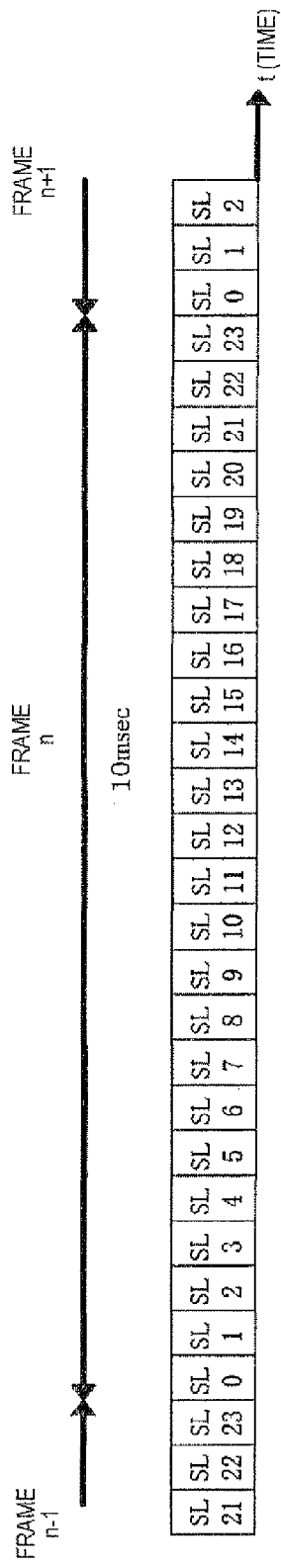
FIG. 3 is a diagram showing an example of a time division scheme in wireless communication in the embodiment of the present invention.

Next, a configuration example of a communication frame in wireless communication will be described. In wireless communication in the communication system 1000, a time division scheme in which 10 msec are set at one frame and the one frame is divided into 24 slots and communication is conducted is used as shown in, for example, FIG. 3. The communication of the time division scheme includes, for example, TDMA/TDD (Time Dimension Multiple Access/Time Division Duplex) communication. In an example shown in FIG. 3, a time length obtained by dividing one frame (10 msec) into 24 equal pieces is set at one slot. Any slot is allocated to each communication apparatus every time the communication is started. Each communication apparatus communicates with another communication apparatus using the allocated slot.

The synchronous signal is also called a beacon signal, and includes synchronous data (for example, Syncword). The Syncword is a predetermined numerical sequence for timing synchronization, and is data of a predetermined known pattern used as synchronous information for synchronizing the telephone apparatus (PS 200) and the other slave CSs described above. In the DECT mode, unique Syncword is allocated every network, and a signal transmitted by each terminal belonging to one network includes its Syncword in common.

Figure 4:
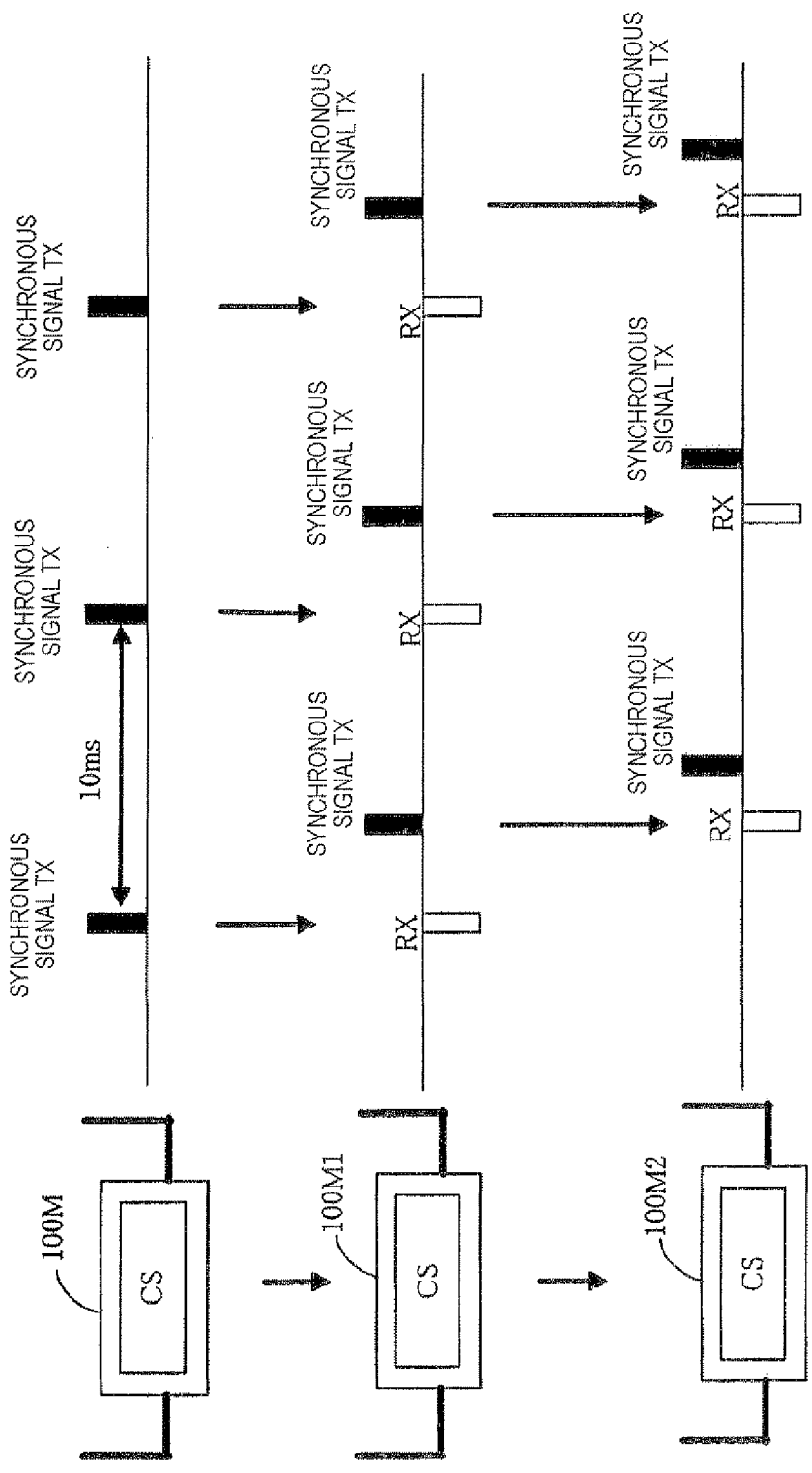
FIG. 4 is a diagram showing one example of transmitting and reception timing of a synchronous signal in a normal state of the base station apparatus in the embodiment of the present invention.
Figure 5:
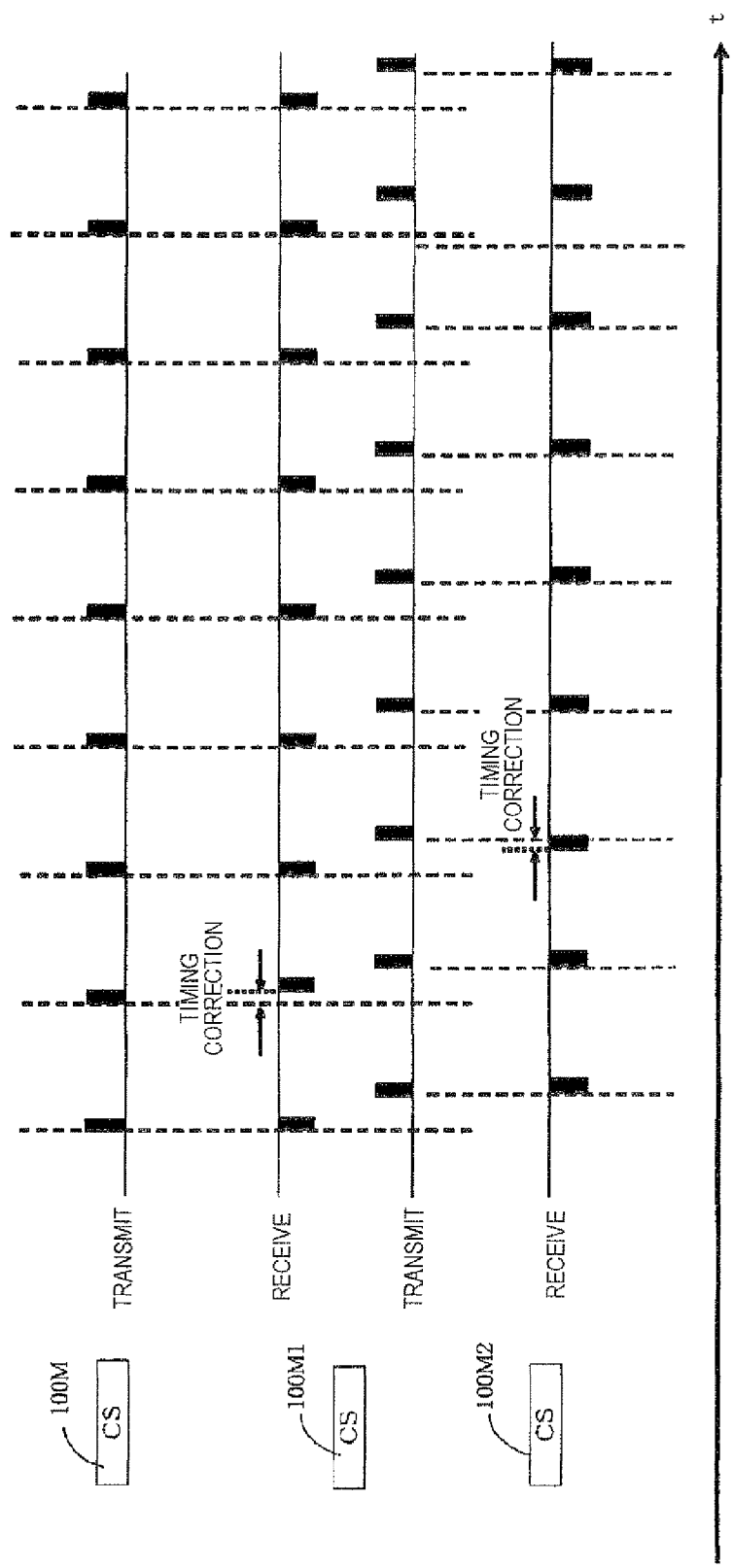
FIG. 5 is a diagram showing a correction example of communication timing in a normal state of the base station apparatus in the embodiment of the present invention.

Next, synchronous processing in a normal state of the CS 100 will be described. FIG. 4 is a diagram showing one example of transmission and reception timing of a synchronous signal in a normal state of the CS 100. FIG. 5 is a diagram showing a correction example of communication timing in a normal state of the CS 100.

Generally, each CS synchronizes mutually by periodically receiving a synchronous signal from a CS which is a master. FIGS. 4 and 5 illustrate synchronous processing between the CS 100M, the CS 100M1 and the CS 100M2. The CS 100M operates as a synchronous master (master CS) of the CS 100M1, and the CS 100M1 operates as a synchronous master of the CS 100M2.

As shown in FIG. 4, the CS 100M transmits a synchronous signal (synchronous signal TX) at regular intervals (for example, slot 0 of a communication signal 30). As shown in the drawing, the CS 100M1 which is a slave receives the synchronous signal from the CS 100M which is a master (RX), and operates in synchronization with communication timing of the CS 100M. Also, the CS 100M1 transmits its own synchronous signal (synchronous signal TX) at regular intervals (for example, slot 7 of the communication signal 30).

The CS 100M2 shown in FIG. 4 receives the synchronous signal from the CS 100M1 (RX), and operates in synchronization with communication timing of the CS 100M1. Also, the CS 100M2 transmits its own synchronous signal at regular intervals (for example, slot 15 of the communication signal 30).

Also as shown in FIG. 5, when a time lag occurs between the CS 100M1 and the CS 100M, the CS 1.00M1 detects a time position of Syncword included in the synchronous signal, and corrects communication timing using its detection result. FIG. 5 illustrates the case where the communication timing of the CS 100M1 is later than predetermined timing.

Also, when a time lag occurs between the CS 100M2 and the CS 100M1, the CS 100M2 corrects communication timing using information about the time lag included in the synchronous signal. FIG. 5 illustrates the case where the communication timing of the CS 100M2 is earlier than predetermined timing.

Next, survey operation for deciding the highest master base station (master CS) in the case of installing the base station apparatus (CS 100) in a building etc. will be described.

FIG. 6 shows an example in which a value of electric field strength (RSSI: Received Signal Strength Indicator) in the case where the base station apparatus receives a signal from another base station apparatus is divided into plural segments and parameters weighted according to the respective segments of electric field strength are decided. Hereinafter, the parameter set every segment of RSSI is described as Cost (a cost value).

For example, when the wireless communication unit 101 of a CS 100M receives a signal from another CS 100M1, the cost value is set at "1" when the electric field strength is −40 dBm or more, and the cost value is set at "2" when the electric field strength is in the range from −50 dBm to −40 dBm. The cost value is weighted so as to become a larger value as the electric field strength becomes lower.

Figure 7:
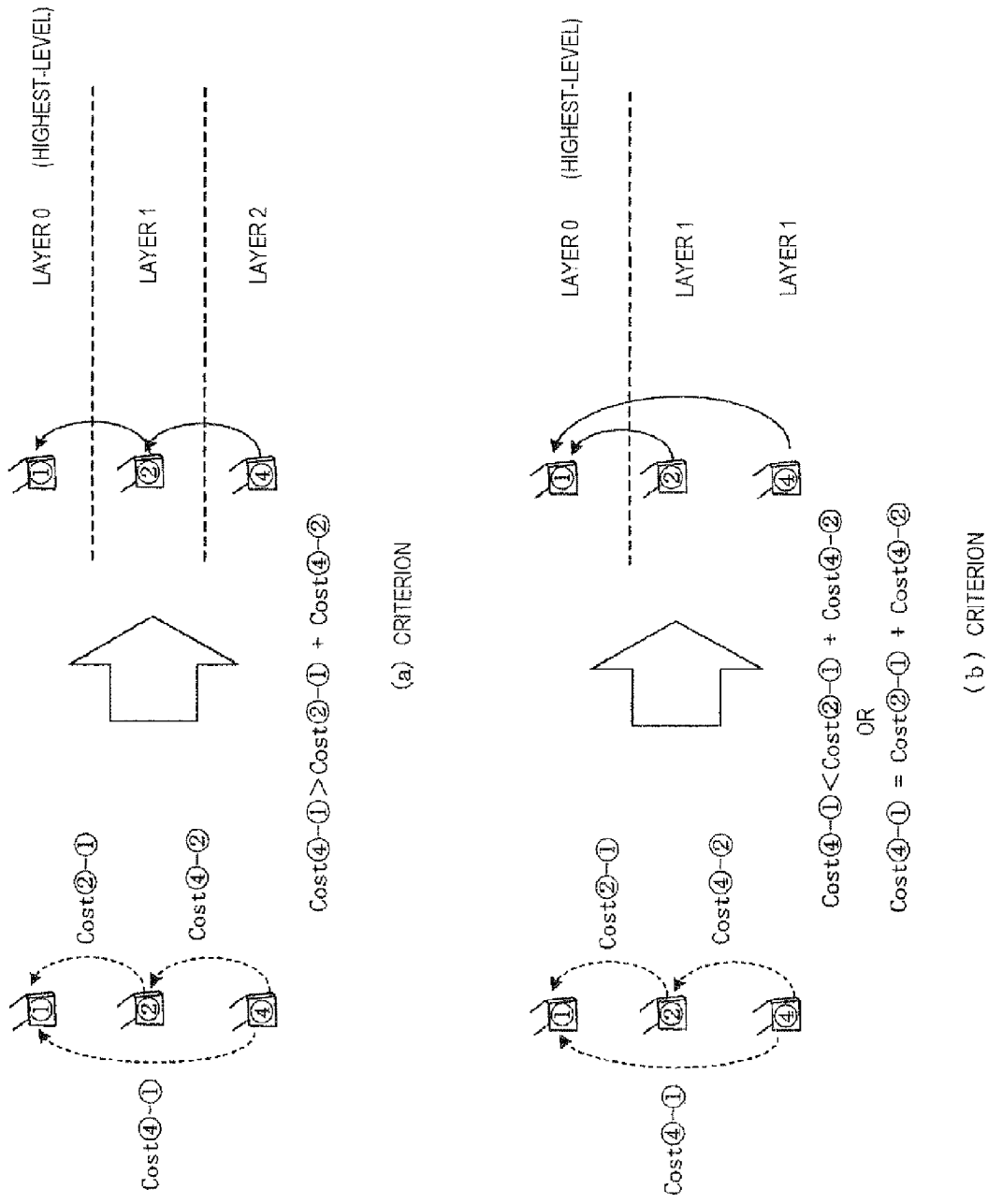
FIG. 7 is a diagram showing criteria for deciding a master/slave relation between the plural base station apparatuses in the embodiment of the present invention.

FIG. 7 shows basic criteria for deciding a master/slave relation between the plural base station apparatuses (CSs 100). When a cost value in the case where CS(1) receives a signal from CS(2) is set at "Cost(2)-(1)" and a cost value in the case where CS(2) receives a signal from CS(4) is set at "Cost(4)-(2)" and a cost value in the case where CS(1) directly receives a signal from CS(4) is set at "Cost(4)-(1)", determination is basically made by the following criterion (a) and criterion (b).

In the criterion (a), when Cost(4)-(1) is larger than the sum of Cost(2)-(1) and Cost(4)-(2), another CS (CS(2) in FIG. 7) is to be interposed between CS(1) and CS(4), and CS(4) is used as a slave of CS(2). In this case, it is likely that a distance between CS(1) and CS(4) is considerably long or an obstacle is present between CS(1) and CS(4). As a result, it is better that another CS should be interposed between CS(1) and CS(4).

Also, in the criterion (b), when Cost(4)-(1) is smaller than the sum of Cost(2)-(1) and Cost(4)-(2), another CS is not to be interposed between CS(1) and CS(4), and CS(4) is used as a slave of CS(1). In this case, it is likely that a distance between CS(1) and CS(4) is relatively short and stable communication can be conducted. As a result, it is better that CS(1) should be directly connected to CS(4).

In addition, when Cost(4)-(1) is equal to the sum of Cost (2)-(1) and Cost(4)-(2), handling similar to the criterion (b) is performed. In other words, another CS is not to be interposed between CS(1) and CS(4).

In survey processing, all the CSs receive signals from other CSs in order, and calculate Cost based on respective receiving strengths. That is, each CS respectively performs continuous receiving operation in order, and receives receivable signals from all the CSs, and extracts ID information about CS of an origination source, and measures a received signal strength indicator (RSSI) of its signal., and converts the RSSI into a cost value, and makes recording together with the ID information. The ID information about CS is one example of identification information about CS.

Figure 8:
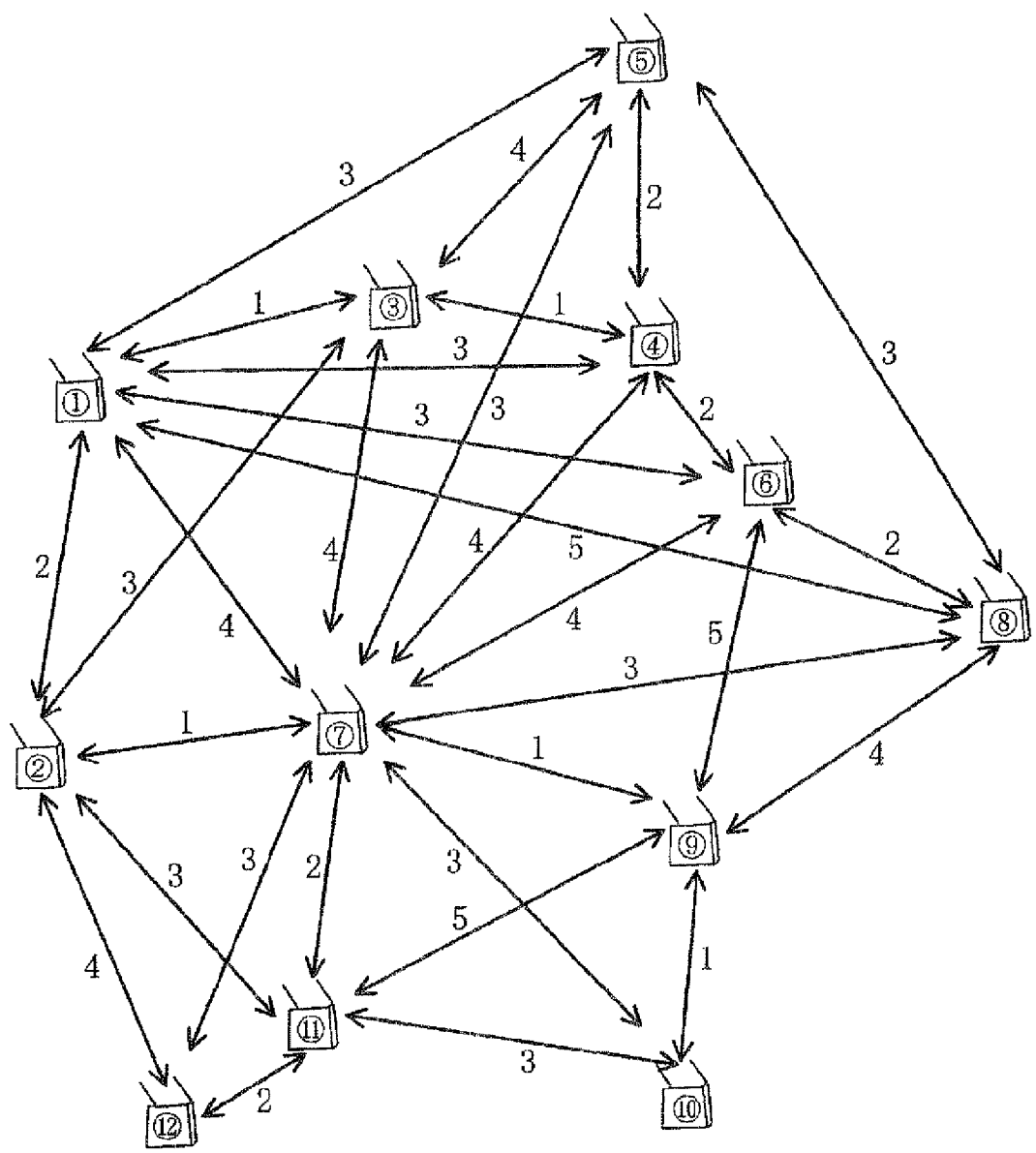
FIG. 8 is a diagram describing an image for measuring the received electric field strength between the plural base station apparatuses in the embodiment of the present invention.

FIG. 8 shows an image for measuring the received electric field strength by plural CSs.

For example, a cost value becomes "2" between CS(1) and CS(2), and a cost value becomes "1" between CS(2) and CS(7). ID information about an origination source CS of all the signals receivable by the respective CSs and the cost value about the signal are collected in one place through the wired network.

FIG. 9 shows one example of the cost values between plural CSs measured. In addition, in FIG. 8, the cost values between all the CSs are not listed in order to facilitate visualization.

Next, survey processing will be described in detail.

Figure 10:
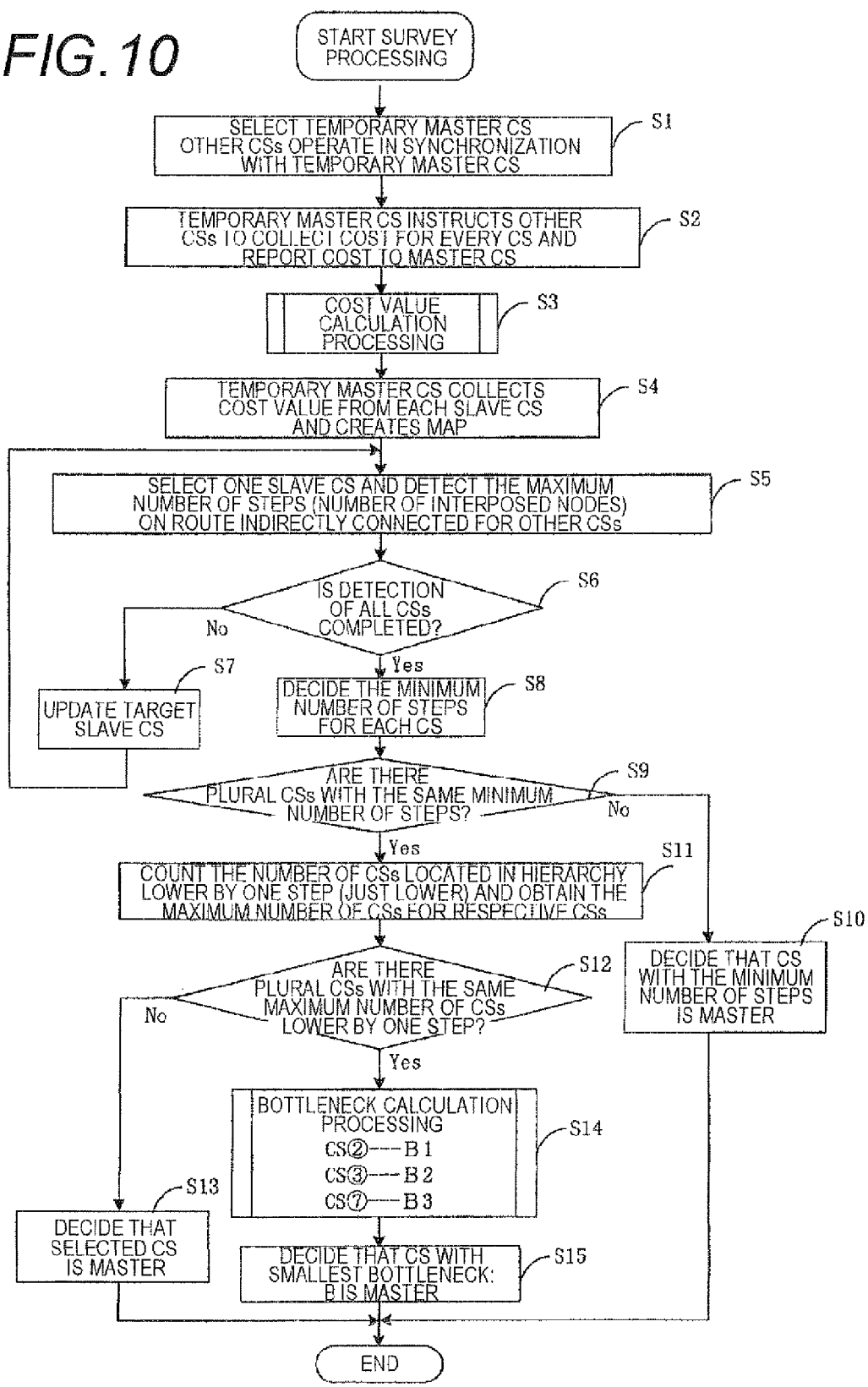
FIG. 10 is a flowchart showing survey processing for deciding a master of the highest layer of the base station apparatus in the embodiment of the present invention.

FIG. 10 is a flowchart showing the survey processing for deciding a master (Master) CS of the highest layer, and is executed in the controller 111 of each CS. Execution of the software for configuration work by the PC 700 decides that one of the plural CSs is a temporary master CS. By transmitting starting instructions from the PC 700 to the temporary master CS, the CS that has received the starting instructions executes the survey processing.

In installation work of the CS, plural CSs (CS(1), CS(2), . . . ) are first installed and the respective CSs are connected by a wired network. Also, the PC 700 for executing the software for configuration work is connected to the same wired network.

When the PC 700 accepts a manipulation for starting the survey processing by a worker through a manipulation unit (not shown), the temporary master CS is decided and the starting instructions are transmitted using the wired network. As shown in FIG. 10, when the temporary master CS is decided, the controller 111 of the temporary master CS controls the wired communication unit 103, and notifies other CSs of information about the temporary master CS through the wired network (step S1). Accordingly, the other CSs start operation in wireless synchronization with the temporary master CS, and a temporary wireless tree is formed.

After the temporary wireless tree is formed, the controller 111 of the temporary master CS controls the wired communication unit 103, and instructs the other CSs to collect a cost value for every CS and report the cost value to the temporary master CS through the wired network (step S2). The controllers 111 of the other CSs perform operation of collecting the cost values according to instructions received through the wired network. Accordingly, all the CSs including the temporary master CS start cost value calculation processing (step S3).

Figure 11:
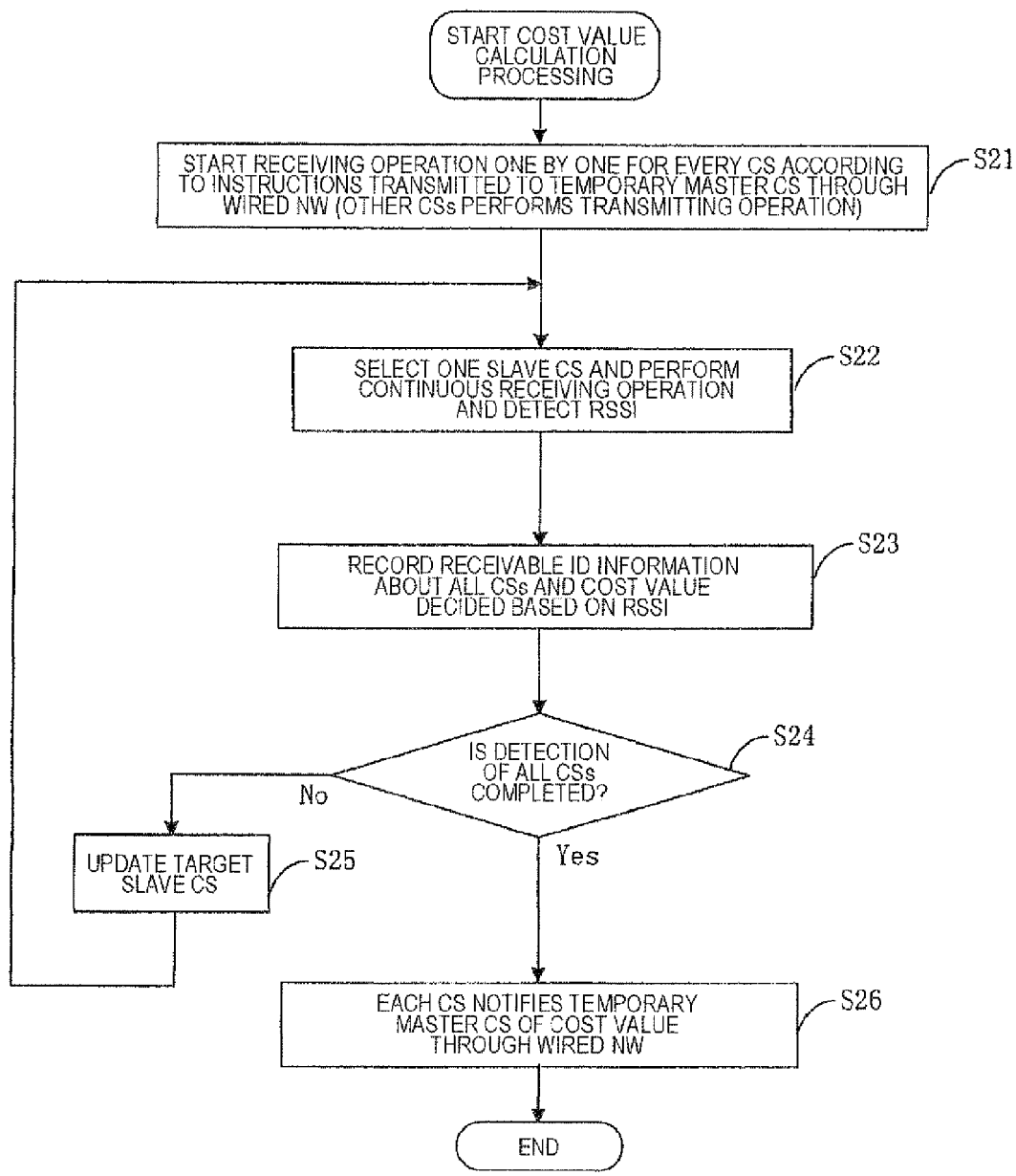
FIG. 11 is a flowchart showing cost value calculation processing between the plural base station apparatuses in the survey processing in the embodiment of the present invention.

FIG. 11 shows the cost value calculation processing between plural base station apparatuses in the survey processing.

In the cost value calculation processing, the controller 111 of each CS controls the wireless communication unit 101, and sequentially starts receiving operation according to instructions transmitted from the temporary master CS through the wired network (step S21).

For example, the controller 111 of the temporary master CS selects a certain slave CS (for example, CS(2)), and causes its slave CS to perform continuous receiving operation, and causes other CSs (CS(3), CS(4), . . . ) to perform transmitting operation (step S22). In the selected slave CS, in the continuous receiving operation, the wireless communication unit 101 receives signals transmitted from other CSs and also detects received signal strength indicators (RSSI) of the respective signals.

The controller 111 of the selected slave CS associates ID information about all the other CSs from which a signal is receivable in the continuous receiving operation with a cost value decided based on RSSI of the signal transmitted from the CS, and records the ID information and the cost value (step S23). The terms, all the other CSs from which a signal is receivable, means all the CSs from which a signal is receivable by the wireless communication unit 101 and ID information about the transmitting source is identifiable.

In step S24, the controller 111 determines whether or not detection operation of all the CSs is completed. When the detection operation of all the CSs is not completed (step S24: No), the slave CS is updated (step S25) and detection of RSSI is repeated.

When the detection operation of all the CSs is completed (step S24: Yes), the wired communication unit 103 of each CS notifies the temporary master CS of the cost value through the wired network. That is, each CS associates the receivable ID information about all the other CSs with the cost value about the signal from the CS, and notifies the temporary master CS of the cost value (step S26).

When the cost value calculation processing of step S3 is completed in FIG. 10, the controller 111 of the temporary master CS collects the receivable cost value and the ID information about all the other CSs respectively by each CS. Then, the controller 111 of the temporary master CS creates a map having the cost values between each CS as shown in, for example, FIG. 9 (step S4).

Then, in the controller 111 of the temporary master CS, it is assumed that each CS is indirectly connected to another or other plural CSs by a route in which one or plural CSs are interposed, and by the criteria shown in FIG. 7, a value of a parameter in the case of making direct connection between the base station apparatuses is compared with a value in which a parameter between the base station apparatuses is added in each, route (one or plural) and thereby, the master/slave relation is temporarily decided.

Then, based on the temporary decision described above, the controller 111 of the temporary master CS detects the maximum number of steps on each route indirectly connected to other CSs for every CS, that is, the maximum number of other CSs interposed (the number of interposed nodes) (step S5).

For example, when only one CS(4) is interposed on a route from CS(3) to CS(5) in CS(3), the number of interposed nodes becomes "1". Also, two of CS(2) and CS(6) are interposed on a route from. CS(3) to CS(8), so that the number of interposed nodes becomes "2". When the number of interposed nodes "2" on the route from CS(3) to CS(8) is larger than the number of interposed nodes on other routes for CS(3), "2" becomes the maximum number of steps for CS(3).

Similarly, when two of CS(7) and CS(9) are interposed on a route from CS(2) to CS(10), the number of interposed nodes becomes "2". Similarly, when four CSs are interposed on a route from CS(2) to CS(8), the number of interposed nodes becomes "4".

Thus, the controller 111 of the temporary master CS examines the maximum number of steps (the maximum number of interposed nodes) on each route indirectly connected to other CSs every CS.

In step S6, the controller 111 of the temporary master CS determines whether or not determination of the maximum number of steps is completed for all the CSs. When the determination is not completed (step S6: No), a target of detection is updated to another CS (step S7) and detection of the maximum number of steps in step S5 is repeated.

When operation of the determination of the maximum number of steps is completed for all the CSs (step S6: Yes), the controller 111 decides the minimum number of steps in each of the numbers of steps in step S8.

In step S9, the controller 111 of the temporary master CS determines whether or not there are plural CSs with the same minimum number of steps (step S9). When there is only one CS having the minimum number of steps (step S9: No), the controller 111 of the temporary master CS decides that one CS having the minimum number of steps is a formal master CS of the highest layer in step S10.

When there are plural CSs having the minimum number of steps (step S9: Yes), the controller 111 of the temporary master CS counts the number of slave CSs located in the hierarchy lower by one step (just lower) and obtains the maximum number of CSs for the respective CSs (step S11).

In the next step S12, it is determined whether or not there are plural CSs with the same maximum number of CSs lower by one step (step S12). When there are not plural CSs with the same maximum number of CSs, that is, there is only one CS having the maximum number of CSs lower by one step (step S12: No), the controller 111 of the temporary master CS decides that its CS is a formal master CS of the highest layer (step S13).

When there are plural CSs having the maximum number of CSs lower by one step (step S12: Yes), the processing proceeds to bottleneck calculation processing (step S14). Hereinafter, each CS in the case of having plural. CSs having the maximum number of CSs lower by one step is called a candidate for a master CS.

Figure 12:
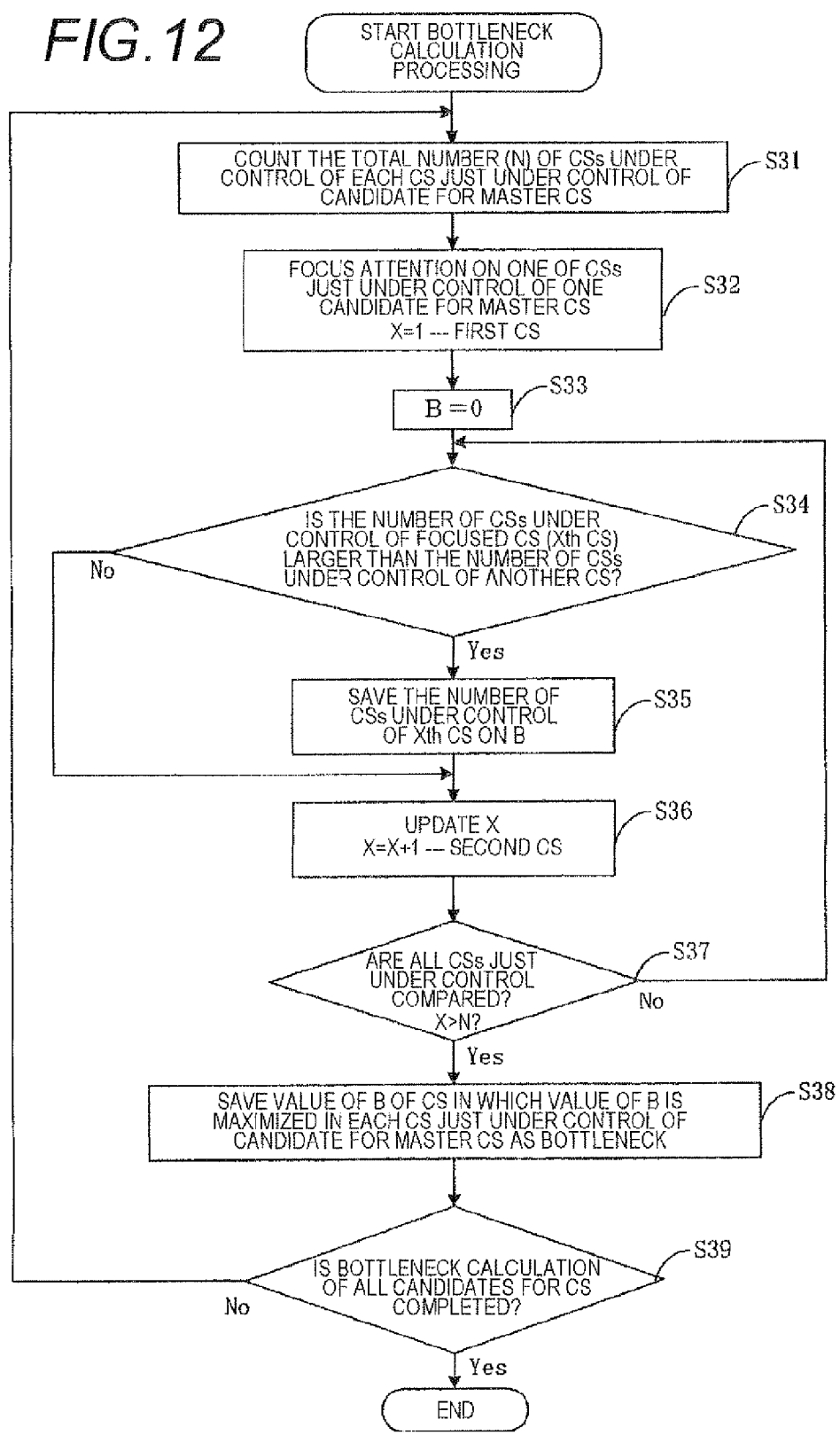
FIG. 12 is a flowchart showing bottleneck calculation processing for distinguishing the base station apparatus causing a bottleneck in the survey processing in the embodiment of the present invention.

FIG. 12 shows bottleneck calculation processing for distinguishing a base station apparatus causing a bottleneck in the survey processing. Operation of FIG. 12 is performed by the candidate for the master CS.

First, in step S31, the controller 111 of the temporary master CS counts the total number (N) of CSs under the control of each CS present just under control of the candidate for the master CS.

Next, the controller 111 of the temporary master CS focuses attention on one of the CSs present just under control of one candidate for the master CS (step S32), and determines whether or not the number of CSs under the control of the focused CS (Xth CS) is larger than the number of CSs under the control of another CS (step S34). In addition, a variable X is a serial number of the focused CS, and a variable B is a variable for storing the number of CSs under the control of the CS, and an initial value is set at B=0 (step S33).

When the number of CSs under the control of the focused CS (Xth CS) is larger than the number of CSs under the control of another CS (step S34: Yes), the controller 111 of the temporary master CS saves the number of CSs under the control of the focused CS (Xth CS) on the variable B and updates the variable B (step S35).

Then, the controller 111 of the temporary master CS updates the variable X (step S36), and focuses attention on the next CS. In addition, when the number of CSs under the control of the focused CS (Xth CS) is smaller than or equal to the number of CSs under the control of another CS (step S34: No), the variable B is not updated and the variable X is updated.

In step S37, the controller 111 of the temporary master CS determines whether or not operation of comparison of all the CSs present just under control of one candidate for the master CS is completed (X>N?) (step S37). When the operation of comparison is not completed (step S37: No), the processing is repeated until the comparison of all the CSs present just under control of the candidate for the master CS is completed, so that the processing proceeds to step S34.

When the comparison of all the CSs present just under control of one candidate for the master CS is completed (step S37: Yes), the processing proceeds to step S38. The controller 111 of the temporary master CS saves a value of the variable B of the CS in which a value of the variable B is maximized in each of the CSs present just under control of the candidate for the master CS as a parameter representing a bottleneck of the candidate for the master CS (step S38).

In step S39, the controller 111 of the temporary master CS determines whether or not calculation of bottlenecks for all the candidates for the master CS is completed (step S39). When the calculation of bottlenecks is not completed (step S39: No), the processing is repeated until the calculation of bottlenecks for all the candidates for the master CS is completed, so that the processing proceeds to step S31. When the calculation of bottlenecks for all the candidates for the master CS is completed (step S39: Yes), the processing of FIG. 12 is ended to return to the processing of FIG. 10.

When the bottleneck calculation processing for all the candidates for the master CS is completed, the controller 111 of the temporary master CS decides that the CS with the smallest parameter B representing the bottleneck is a formal master in FIG. 10 (step S15). The parameter (variable) B means the size of the bottleneck under the control of the CS.

For example, candidates for the master CS are CS(2), CS(3) and CS(7), and CS(2) has B1="2" and CS(3) has B2="3" and. CS(7) has B3="1". In this case, it is decided that CS(3) in which the parameter B (B1, B2, B3) representing the bottleneck is smallest is a formal master CS of the highest layer.

By such determination, the master CS can be decided so as to level the bottleneck of each CS placed just under control of the highest layer. The leveling of the bottleneck refers to a state in which a difference between superiority is minimized.

Thus, it is assumed that each candidate for the master CS is the master CS, and a value of the variable B in which a value of the variable B is maximized in each of the CSs located just under control of every assumed master CS is extracted every candidate for the master CS. In this case, when it is decided that the CS in which the value of the variable B is smallest in each candidate for the master CS is a formal master CS, the bottleneck can be leveled the most.

When the formal master CS is decided as described above, in the temporary master CS, the wired communication unit 103 notifies other CSs of information about ID etc. for the formally decided master CS through the wired network. Accordingly, a wireless tree is newly formed around the decided master CS. Afterward, each CS operates according to the new wireless tree.

Figure 13:
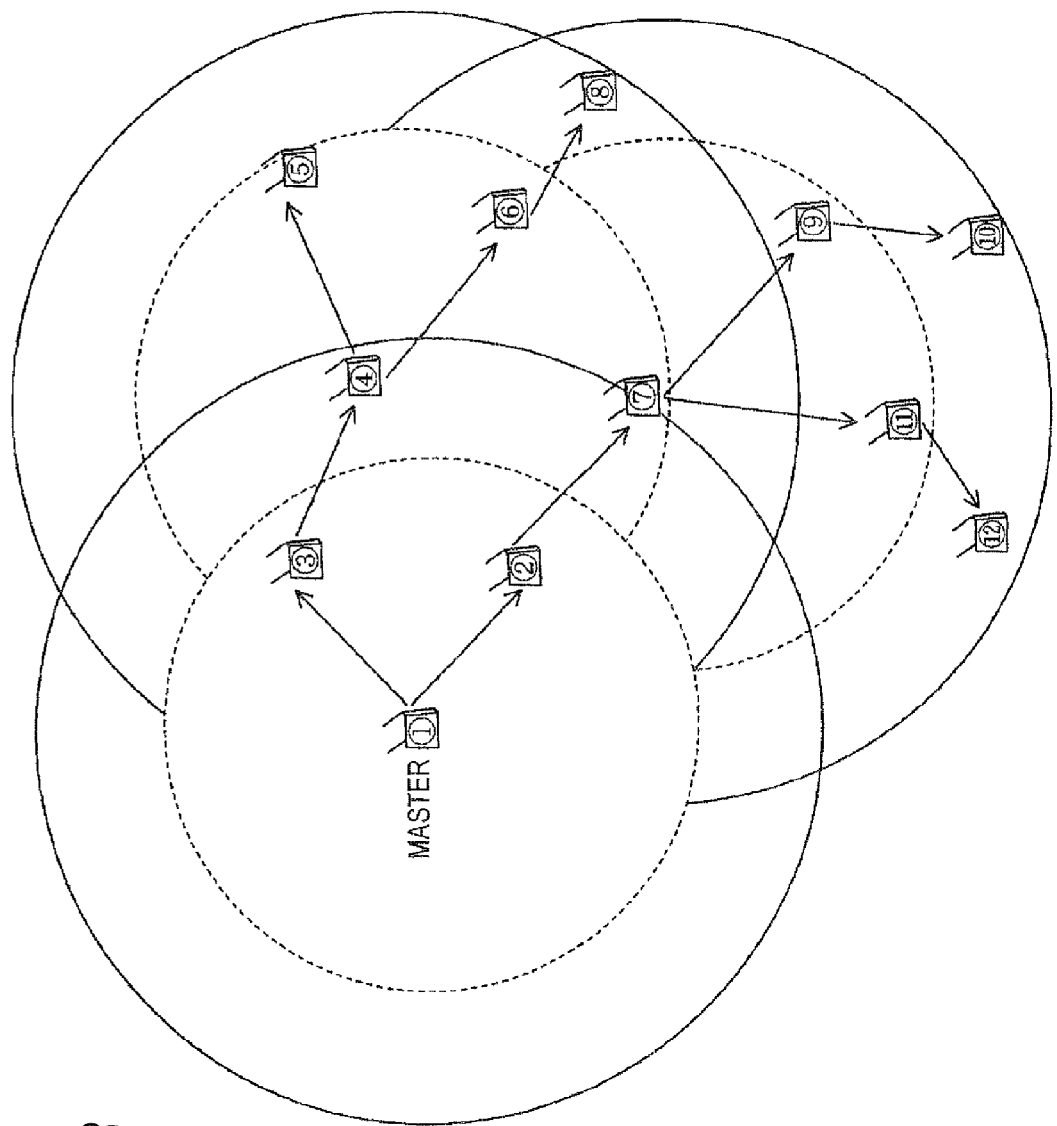
FIG. 13 is a diagram representing one example of a communication area in the case of deciding that a base station apparatus is a master of the highest layer in the embodiment of the present invention.

FIG. 13 shows one example of a communication area in the case of deciding that one CS is a master of the highest layer. Also, FIG. 14 shows one example of a tree configuration in the case of deciding that the same CS as that of FIG. 13 is a master of the highest layer.

In the example of FIG. 13, CS(1) is a master of the highest layer, and plural CSs operating as slaves under the control of CS(1) are arranged. For example, a total of two CSs of CS(2) operating as a slave to CS(1) and CS(3) operating as a slave to the same CS(1) are positioned in a communication area of CS(1). Also, two CSs of CS(5) operating as a slave to CS(4) and CS(6) operating as a slave to the same CS(4) are positioned in a communication area of CS(4). Also, two CSs of CS(9) operating as a slave to CS(7) and CS(11) operating as a slave to the same CS(7) are positioned in a communication area of CS(7). In addition, FIG. 13 illustrates the communication areas of only CS(1), CS(4) and CS(7) having plural slave CSs under the control as an example.

Each CS wirelessly synchronizes according to a master CS present at a layer higher than each CS. For example, CS(10) synchronizes according to a higher master CS(9). CS(9) synchronizes according to a higher master CS(7). CS(7) synchronizes according to a higher master CS(2). CS(2) synchronizes according to the highest master CS(1).

Figure 15:
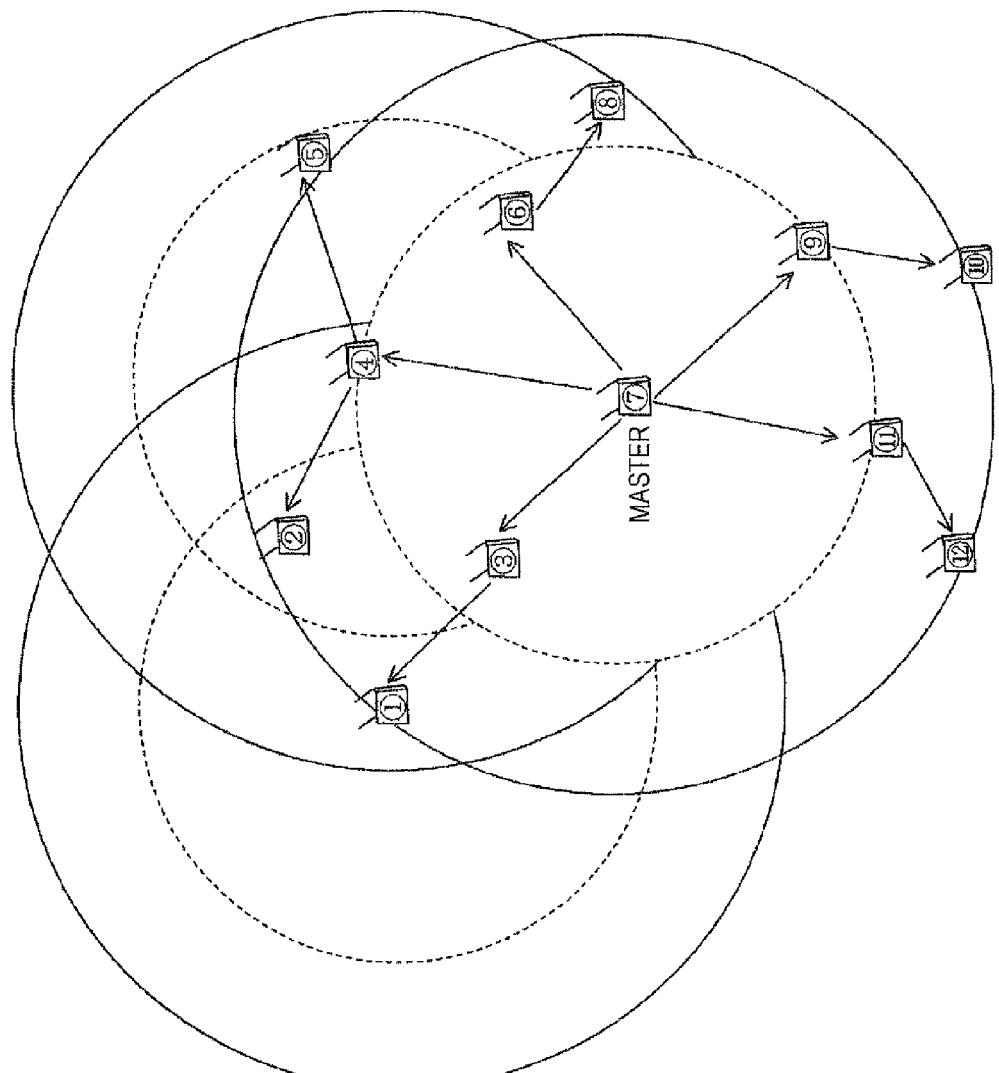
FIG. 15 is a diagram representing one example of a communication area in the case of deciding that another base station apparatus is a master of the highest layer in the embodiment of the present invention.
Figure 16:
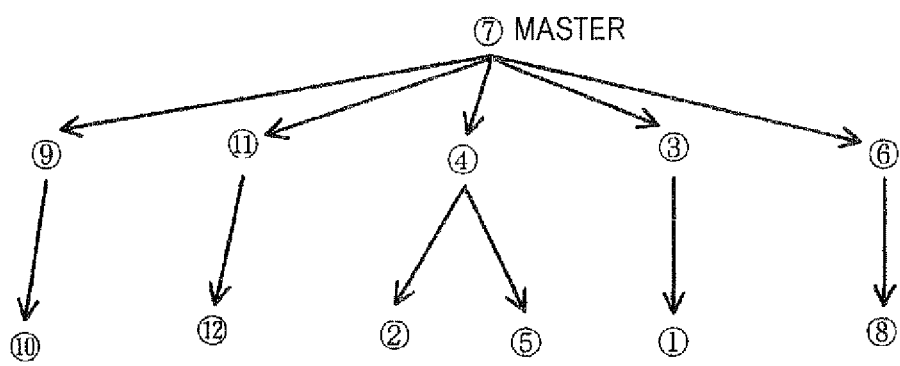
FIG. 16 is a diagram representing one example of a tree configuration in the case of deciding that another base station apparatus is a master of the highest layer in the embodiment of the present invention.

FIG. 15 shows one example of a communication area in the case of deciding that another CS is a master of the highest layer. Also, FIG. 16 shows one example of a tree configuration in the case of deciding that the same CS as that of FIG. 15 is a master of the highest layer. The examples of FIGS. 15 and 16 are an example of a tree configuration set so as to attach importance to a bottleneck.

In the examples of FIGS. 15 and 16, CS(7) is a master of the highest layer, and there are many CSs operating as slaves under the control of CS(7). For example, CS(3), CS(4), CS(6), CS(9) and CS(11) present in a communication area of CS(7) operate as slaves to CS(7). Also, CS(2) and CS(5) present in a communication area of CS(4) operate as slaves to CS(4).

There are two CSs (CS(2) and CS(5)) operating as slaves under the control of CS(4). On the other hand, there is only one CS operating as slaves under the control of CS(3), CS(6), CS(9) and CS(11), respectively. Even for CS(4) with the largest bottleneck, the number of CSs under the control of CS(4) is only two, and even when CS(4) becomes inoperative, a ratio of the number of CSs influenced is lower than the total number of CSs. Thus, by leveling the bottleneck, the CS placed just under control of the master (CS(7)) of the highest layer can reduce the influence in the case where the master CS becomes inoperative.

Figure 17:
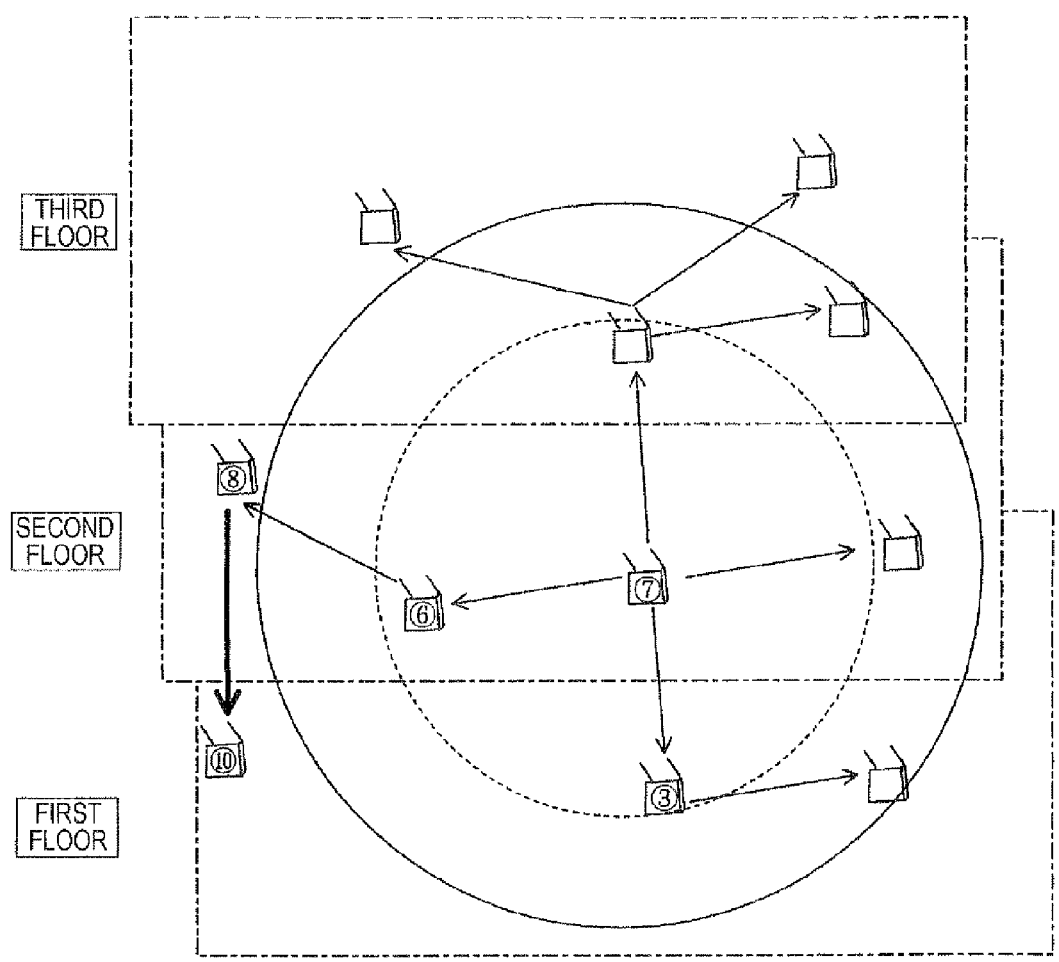
FIG. 17 is a diagram representing one example of a communication area in the case of installing the base station apparatuses in the embodiment of the present invention inside a building across floors.

FIG. 17 shows one example of a communication area in the case of installing base station apparatuses for example, CS) inside a building across floors. CS(10) installed on the first floor is set as a slave of CS(3) installed on the same first floor for conventional manual configuration work. If a condition of communication between CS(10) and CS(3) is poor, CS(10) may be used with communication unstable when an installation worker works without becoming aware of badness of the condition of communication.

By performing the survey processing described above, the controller 111 of the temporary master CS detects that, for example, communication between CS(10) installed on the first floor and CS(8) installed on the second floor can be conducted relatively stably. Also, CS(10) is set as a slave of CS(8) installed on the second floor, so that a burden on the worker can be reduced and a more stable tree configuration can be formed.

Figure 18:
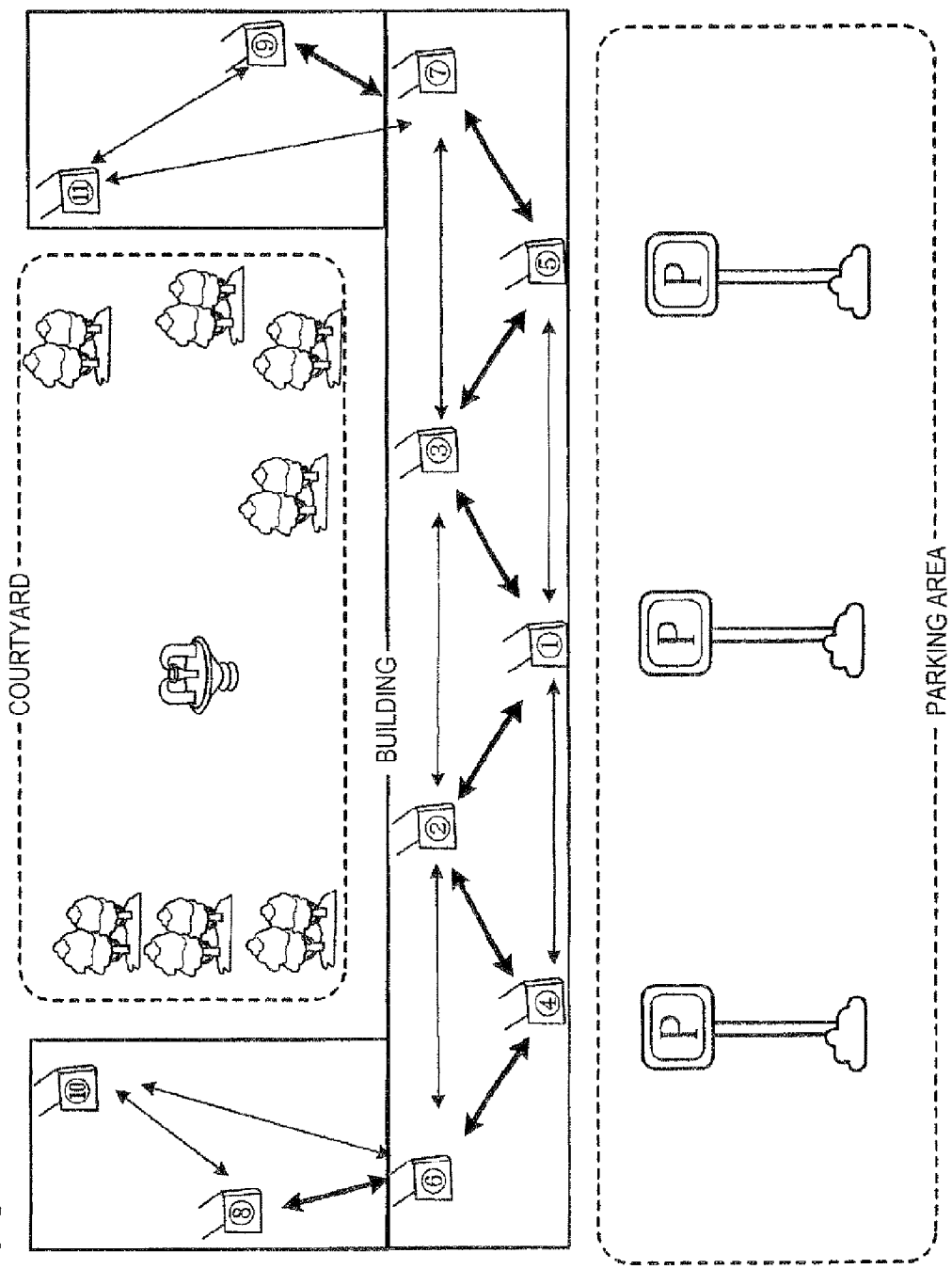
FIG. 18 is a diagram representing an example of a communication path in the case of installing the base station apparatuses in the embodiment of the present invention in large facilities such as a hotel.

FIG. 18 is an example of a communication path in the case of installing base station apparatuses (for example, CS) in large facilities such as a hotel, and CS(1) is a master of the highest layer. A thicker arrow line of FIG. 18 means that received electric field strength is higher. CS(4) or CS(6) becomes a bottleneck having many CSs under the control. Since a distance between CS(4) and CS(2) is relatively short, CS(4) is set as a slave of CS(2) for conventional manual configuration work.

By the criterion (b) of FIG. 7, when Cost(4)-(1) is smaller than or equal to the sum of Cost(2)-(1) and Cost(4)-(2) in the case of direct transmitting and receiving of CS(4) and CS(1), CS(4) is used as a slave of CS(1). Also, in consideration of a bottleneck of a lower side of CS(4), CS(4) is advantageously set just under control of the master CS(1) of the highest layer.

Next, operation after the master CS of the highest layer is formally decided will be described. In the example of the tree configuration shown in FIG. 14, CS(2) synchronizes according to a synchronous signal from the master CS (for example, CS(1)) arranged at the high layer, and CS(7) lower than CS(2) synchronizes according to a synchronous signal from CS(2) which is a master. The other CSs synchronize according to the synchronous signal from the high master CS(2).

The wireless communication determination unit 104 of CS shown in FIG. 2 determines whether or not the wireless communication unit 101 normally receives a synchronous signal from the master CS. The wireless communication determination unit 104 determines whether or not the wireless communication unit 101 of CS receives the synchronous signal from the master CS at predetermined reception timing.

The communication timing correction unit 107 of each CS corrects communication timing according to the synchronous signal from CS arranged at the high layer. That is, at the time of normal operation, each CS decides a correction parameter according to information about a time lag acquired together with the synchronous signal, and holds the correction parameter in the storage unit 109. Accordingly, even when the synchronous signal is lost temporarily, each CS can maintain the communication timing at predetermined timing by this correction parameter to maintain synchronization.

Next, another example of bottleneck calculation processing will be described. First, like the example described above, a slave CS (one or plural) just under control of each candidate for the master CS calculates the sum of slave CSs present in the low side of just the low slave CS. Next, a ratio of the sum of the slave CSs described above to the total number of CSs is calculated.

For example, it is assumed that for CS(1) of a candidate for the master CS, the number of CSs under the control of a slave CS(8) present just under control of CS(1) is six and is 50% of the total number and also the number of CSs under the control of a slave CS(10) present just under control of CS(1) is one and is 7% of the total number. Then, in the case of using CS(1) as a formal master, CSs of 50% of the total number cannot be used when CS(S) just under control of CS(1) causes a malfunction.

Also, it is assumed that for CS(2) of the candidate for the master CS, the number of CSs under the control of a slave CS(6) present just under control of CS(2) is two and is 17% of the total number and also the number of CSs under the control of a slave CS(7) present just under control of CS(2) is three and is 20% of the total number. Then, in the case of using CS(2) as a formal master, CSs of 20% of the total number cannot be used when CS(7) just under control of CS(2) causes a malfunction.

In the example described above, the narrowest bottleneck is CS(8), and it is decided that the candidate (1) for the master CS having this slave CS(8) as the slave CS in just the low side is not suitable for the master. In this case, it is decided that CS(2) is a formal master CS.

In addition, the present invention is not limited to the configuration of the embodiment described above, and can be applied to any configuration as long as the configuration is configurations capable of achieving functions shown in the claims or functions had by the configuration of the embodiment.

In the example described above, the controller 111 of CS decided in the temporary master CS executes the survey operation according to the starting instructions from the PC 700, but it is not limited to this example, and the survey operation may be executed in the PC 700. That is, by executing software for configuration work, the PC 700 may instruct each CS and perform operation for collecting cost values and also perform bottleneck calculation processing.

According an aspect of the present invention, there is provided a communication system in which a plurality of base station apparatuses communicate in a time division wireless communication scheme, in which each of the base station apparatuses measures received electric field strength of receivable signals from other base station apparatuses, and superiority in cases of indirectly connecting each of the base station apparatuses to another or other plural base station apparatuses by a route in which one or plural base station apparatuses are interposed and a case of making direct connection between the base station apparatuses are determined based on a measurement result of the received electric field strength and thereby, the base station apparatus which has the smallest maximum number of the base station apparatuses interposed in each of the routes is decided as the highest master is decided.

According to this configuration, each of the base station apparatuses can measure the received electric field strength of the receivable signals from the other base station apparatuses, and decide the highest master based on the measurement result of the received electric field strength. Consequently, it is unnecessary for an installation worker to sequentially examine a communication environment, and a more stable tree configuration can be formed and a burden on the worker can be reduced.

The communication system may be configured so that when there are more base station apparatuses to be a master, each of the base station apparatuses is assumed as the highest master and performs a bottleneck calculating processing, and then, as a result of the bottleneck calculating processing, a base station apparatus, which have other base station apparatuses just under control of its own having the smallest bottleneck, is decided as the highest master.

According to this configuration, in consideration of a bottleneck having many slave base station apparatuses under the control of the base station apparatus, the highest master can be decided and an influence of the bottleneck can be reduced to form a stable tree configuration.

According another aspect of the present invention, there is provided a base station apparatuses which measures received electric field strength of receivable signals from other base station apparatuses, and superiority in cases of indirectly connecting each of the base station apparatuses to another or other plural base station apparatuses by a route in which one or plural base station apparatuses are interposed and a case of making direct connection between the base station apparatuses are determined based on a measurement result of the received electric field strength and thereby, the base station apparatus which has the smallest maximum number of the base station apparatuses interposed in each of the routes is decided as the highest master is decided.

According to this configuration, the received electric field strength of the receivable signals from the other base station apparatuses can be measured to decide the highest master based on the measurement result of the received electric field strength. Consequently, it is unnecessary for an installation worker to sequentially examine a communication environment, and a more stable tree configuration can be formed and a burden on the worker can be reduced.

The present invention is useful for, for example, a communication system and a base station apparatus capable of forming a more stable tree configuration and reducing a burden on an installation worker.

The present application is based upon and claims the benefit of Japanese patent application No. 2012-110041 filed on May 11, 2012, the contents of which are incorporated by reference in its entirety.

What is claimed is:

1. A base station apparatus used in a communication system having a time division communication scheme in which a plurality of base station apparatuses, in operation, synchronize with a master base station apparatus, the base station apparatus comprising:
a memory,
a processor coupled to the memory and adapted to:
  a) for each of all pairs of two arbitrary communicable base station apparatuses among the plurality of base station apparatuses, collect parameters concerning received electric field strength of communication between the two arbitrary communicable base station apparatuses;
  b) select each of the plurality of base station apparatuses as a candidate master base station apparatus, and for each of the candidate master base station apparatuses:
    i) compare the collected parameters to set a communication route between the candidate master base station apparatus and each of all other base station apparatuses that are communicable with the candidate master base station apparatus; and
    ii) check the number of base station apparatus(es) interposed between the candidate master base station apparatus and each of all other base station apparatuses in each communication route, to determine the maximum number of interposed base station apparatuses;
  c) select a candidate master base station apparatus from the plurality of base station apparatuses evaluated in b) above, which has the smallest maximum number of interposed base station apparatuses, as the master base station apparatus; and
  d) notify all others among the plurality of base station apparatuses of information regarding the selected master base station apparatus.

2. The base station apparatus according to claim 1, wherein the plurality of base station apparatuses are connected through a wired network, and
the base station apparatus collects the parameters through the wired network.

3. The base station apparatus according to claim 1, wherein when it is determined that there are two or more candidate master base station apparatuses which have the smallest maximum number of interposed base station apparatuses, the processor checks the number of secondary base station apparatuses directly connected to each of the two or more candidate master base station apparatuses, and then,
the processor selects a candidate master base station apparatus which has the largest number of direct connections to the secondary base station apparatuses as the master base station apparatus.

4. The base station apparatus according to claim 1, wherein when it is determined that there are two or more candidate master base station apparatuses which have the smallest maximum number of interposed base station apparatuses, the processor checks the number of lower-layer base station apparatuses, which are connected to each secondary base station apparatus directly connected to each of the two or more candidate master base station apparatuses, to determine the maximum number of the lower-layer base station apparatuses connected to each secondary base station apparatus for each of the two or more candidate master base station apparatuses, and then,
the processor selects a candidate master base station apparatus which has the smallest maximum number of the lower-layer base station apparatuses as the master base station apparatus.

5. The base station apparatus according to claim 3, wherein when it is determined that there are two or more candidate master base station apparatuses which have the largest number of direct connections to the secondary base station apparatuses, the processor checks the number of lower-layer base station apparatuses, which are connected to each secondary base station apparatus directly connected to each of the two or more master candidate base station apparatuses, to determine the maximum number of the lower-layer base station apparatuses connected to each secondary base station apparatus for each of the two or more candidate master base station apparatuses, and then,
the processor selects a candidate master base station apparatus which has the smallest maximum number of the lower-layer base station apparatuses as the master base station apparatus.

6. A method of selecting a master base station apparatus used in a communication system having a time division communication scheme, in which a plurality of base station apparatuses, in operation, synchronize with the master base station apparatus, the method being implemented in one of the plurality of base station apparatuses and comprising:
  a) for each of all pairs of two arbitrary communicable base station apparatuses among the plurality of base station apparatuses, collecting parameters concerning received electric field strength of communication between the two arbitrary communicable base station apparatuses;
  b) selecting each of the plurality of base station apparatuses as a candidate master base station apparatus, and for each of the candidate master base station apparatuses:
    i) comparing the collected parameters to set a communication route between the candidate master base station apparatus and each of all other base station apparatuses that are communicable with the candidate master base station apparatus; and
    ii) checking the number of base station apparatus(es) interposed between the candidate master base station apparatus and each of all other base station apparatuses in each communication route, to determine the maximum number of interposed base station apparatuses;

c) selecting a candidate master base station apparatus from the plurality of base station apparatuses evaluated in b) above, which has the smallest maximum number of interposed base station apparatuses, as the master base station apparatus; and d) notifying all others among the plurality of base station apparatuses of information regarding the selected master base station apparatus.

* * * * *